US008514009B2

(12) United States Patent
Suzuki et al.

(10) Patent No.: US 8,514,009 B2
(45) Date of Patent: Aug. 20, 2013

(54) CURRENT SENSING CIRCUIT

(75) Inventors: Takamune Suzuki, Niiza (JP); Koichi Ito, Niiza (JP)

(73) Assignee: Sanken Electric Co., Ltd., Niiza-Shi (JP)

( * ) Notice: Subject to any disclaimer, the term of this patent is extended or adjusted under 35 U.S.C. 154(b) by 41 days.

(21) Appl. No.: 13/243,388

(22) Filed: Sep. 23, 2011

(65) Prior Publication Data

US 2012/0074922 A1 Mar. 29, 2012

(30) Foreign Application Priority Data

Sep. 29, 2010 (JP) ................................ 2010-218512

(51) Int. Cl.
*G05F 1/10* (2006.01)

(52) U.S. Cl.
USPC .......................................................... 327/538

(58) Field of Classification Search
USPC .......................... 327/530, 534, 535, 537, 538
See application file for complete search history.

(56) References Cited

U.S. PATENT DOCUMENTS 4,553,084 A 11/1985 Wrathall
6,628,100 B1 * 9/2003 Stendahl et al. .............. 318/701

* cited by examiner

*Primary Examiner* — Lincoln Donovan
*Assistant Examiner* — Sibin Chen
(74) *Attorney, Agent, or Firm* — Birch, Stewart, Kolasch & Birch, LLP

(57) ABSTRACT

A current sensing circuit can prevent operation error due to a rush current and/or a shifted sense ratio. The circuit includes a power MOSFET, a series combination of a sense resistor and a sense MOSFET, which are connected in parallel to the power MOSFET Qph, a delay circuit for delaying the edges of drive signal, by first delay time, a delay circuit for delaying the edges of the drive signal by a second delay time, logic for combining signals and a current sensing circuit for sensing an electric current of the sense MOSFET based on an electric current of the sense resistor.

7 Claims, 7 Drawing Sheets

CURRENT SENSING CIRCUIT

BACKGROUND OF THE INVENTION

1. Field of the Invention

The present invention relates to a current sensing circuit of MOSFET. More particularly, the present invention relates to a current sensing circuit that can prevent any operation error due to a rush current or a shifted sense ratio at the rising edge of a gate signal of a MOSFET and also any operation error that can arise when it is widely on duty as well as any ASO destruction of a sense MOSFET at a falling edge of a gate signal of a MOSFET.

2. Description of the Related Art

Patent Document 1 (U.S. Pat. No. 4,553,084) describes a known current sensing circuit, or a current sensing means, for sensing the electric current flowing through a power MOSFET (metal oxide semiconductor field effect transistor) by means of a sense MOSFET and a sense resistor. With the prior art technique, a plurality of small capacity MOSFETs, each being referred to as cell, are connected in parallel to form a power MOSFET and a single sense MOSFET, or a single cell, is connected in parallel to the power MOSFET and arranged on a same semiconductor chip. Since the large number of cells are manufactured through a same manufacturing process and hence have same characteristics in common, electric currents flow respectively through the power MOSFET and the sense MOSFET as a voltage is applied between the gate and source of each of the cells and the intensities of the electric currents are proportional to the number of cells. If the ratio of the number of cells of the power MOSFET to the number of cells of the sense MOSFET is 3,000:1, the intensities of the electric currents also show a ratio of 3,000:1. Since the intensity of the electric current flowing through the sense MOSFET is proportional to that of the electric current flowing through the power MOSFET, the sense signal obtained by sensing the electric current flowing through the sense MOSFET by means of a sense resistor can be utilized as sense signal for a limiter for limiting a load current.

When a known current sensing circuit of the above described type is applied to sensing the electric current of the power MOSFET of a step-down DC-DC converter, the over-current protection circuit and the control circuit can react to commit an operation error the moment when the high-side MOSFET is turned on because it can also sense the rush current due to the recovery performance of a free wheel diode.

Additionally, the sense ratio (=sense MOSFET current/power MOSFET current) is above a steady value when the gate-source voltage Vgs is increasing/decreasing. For this reason, a large electric current flows through the sense MOSFET to make the over-current protection circuit fall into an operation error. To avoid this problem, a countermeasure such as providing a masking time to disregard the time period during which an excessive sense current flows or inserting a large filter in the current sensing circuit at a position downstream to the sense resistor may be required.

The relationship between the sense ratio in steady state and the sense ratio when the gate-source voltage Vgs is increasing/decreasing will be described below by referring to FIGS. 1 and 2.

FIG. 1 is an exemplar circuit diagram of a known current sensing circuit 4 applied to sensing the electric current of the power MOSFET of a step-down DC-DC converter, showing the circuit configuration thereof. FIG. 2 is a chart showing the signal waveforms and the operation waveforms of different sections of the circuit of FIG. 1.

Referring to FIG. 1, reference symbol Qph denotes a power MOSFET that is designed to operate as high-side switching device while reference symbol Qs denotes a sense MOSFET that is designed to sense the electric current of the power MOSFET. The source terminal of the power MOSFET Qph and that of the sense MOSFET Qs are connected to each other and the drain terminal of the power MOSFET Qph is connected to a DC power source Vin. The drain terminal of the sense MOSFET Qs is connected to the DC power source Vin by way of a sense resistor Rs. The connection point where the source terminal of the power MOSFET Qph and that of the sense MOSFET Qs are connected is by turn connected to an output terminal O by way of a reactor L. A free wheel diode Df is connected between the connection point where the source terminal of the power MOSFET Qph and that of the sense MOSFET Qs are connected and a grounding terminal and a smoothing capacitor C and a load RL are connected between the output terminal O and the grounding terminal. The reactor L and the smoothing capacitor C form a DC smoothing circuit at the output section of the step-down DC-DC converter. The sense resistor Rs is connected at the opposite ends thereof to the inverting terminal (−) and the non-inverting terminal (+) of a current sensing circuit OTA (operational transconductance amplifier: an amplifier for converting a voltage into a current). The current sensing circuit OTA detects any voltage fall of the sense resistor Rs and outputs it as a current signal. A drive signal Sg1 is input to the gate of the power MOSFET Qph and that of the sense MOSFET Qs through a buffer circuit Bf so as to control the power MOSFET Qph and the sense MOSFET Qs for on and off.

Sense ratio is defined as [sense MOSFET current Is/power MOSFET current Ip] and the problems of the conventional art will be examined below by using the sense ratio that is expressed in terms of the resistance value of the power MOSFET Qph, that of the sense MOSFET Qs and that of the sense resistor Rs.

When the on-resistance of the power MOSFET Qph is Rqp, that of the sense MOSFET Qs is Rqs and the voltage at the connection point where the source terminal of power MOSFET Qph and that of the sense MOSFET Qs are connected is Vsw, the following equations hold true:

$$Ip=(Vin-Vsw)/Rqp \text{ and}$$

$$Is=(Vin—Vsw)/(Rqs+Rs).$$

Hence, the sense ratio Is/Ip=Rqp/(Rqs+Rs).

Assume here that Rqs=10Ω, Rqp=1Ω and Rs=10Ω while the gate-source voltage Vgs is sufficiently high (and in steady state after a gate signal is input), the sense ratio will be expressed as $$\begin{aligned}\text{sense ratio } Is/Ip &= Rqp/(Rqs+Rs)\\ &= 1/(10+10)\\ &= 1/20.\end{aligned}$$

On the other hand, while the gate-source voltage Vgs is increasing/decreasing, for the on-resistance of MOSFET to be high (assuming that Rqs=100Ω and Rqp=10Ω because the ratio of Rqs and Rqp does not change) and the resistance of the sense resistor Rs to be fixed, the sense ratio will be expressed as $$\text{sense ratio } Is/Ip = Rqp/(Rqs + Rs) = 10/(100 + 10) = 1/11.$$

In other words, it is greater than the value in steady state, or 1/20.

Thus, it will be seen that the sense ratio will be high while the gate-source voltage Vgs is increasing/decreasing if compared with the sense ratio in steady state after a gate signal is input.

As the sense ratio changes, the sense ratio of the circuit and the current waveform of the sense MOSFET Qs shown in FIG. 1 will become those shown in FIG. 2. The waveforms in FIG. 2 are from above that of drive signal Sg1, that of the gate-source voltage Vgs_p of the power MOSFET, that of the gate-source voltage Vgs_s of the sense MOSFET, that of the voltage Vsw at the connection point of the source terminal of the power MOSFET Qph and that of the sense MOSFET Qs, that of the sense ratio Is/Ip and that of the electric current Is of the sense MOSFET Qs.

As drive signal Sg1 is input at clock time t1 and gets to a high level, both the gate-source voltage Vgs_p of the power MOSFET and that of the gate-source voltage Vgs_s of the sense MOSFET Qs rise and, when they get to threshold value Vth at clock time t2, the power MOSFET Qph and the sense MOSFET Qs start to become on. As the sense MOSFET Qs becomes on, the voltage Vsw of the connection point where the source terminal of the power MOSFET Qph and that of the sense MOSFET Qs are connected starts rising. As the voltage Vsw rises, a rush current flows to the free wheel diode Df due to its recovery performance immediately after the power MOSFET Qph becomes on.

As the sense MOSFET Qs becomes on, an electric current is sensed due to the sense resistance and the sense ratio Is/Ip rises (the part indicated by A in FIG. 2) while the gate-source voltage Vgs is increasing until it gets a steady value at clock time t3 (period t2 and t3). On the other hand, as the input of the drive signal Sg1 is stopped at clock time t4 and the signal gets to a low level, both the gate-source voltage Vgs_p of the power MOSFET and that of the gate-source voltage Vgs_s of the sense MOSFET fall and both the power MOSFET Qph and the sense MOSFET Qs become off when their voltages get to threshold value Vth at clock time t5. At this time, a circulating current flows to the free wheel diode Df due to the induced electromotive force of the reactor L. The voltage Vsw of the connection point where the source terminal of the power MOSFET Qph and that of the sense MOSFET Qs are connected to each other becomes a negative potential that is negative by the forward voltage of the free wheel diode Df. However, the voltage Vsw is assumed here to be equal to 0V for the sake of simplicity of the following explanation. The sense ratio Is/Ip rises even while the gate-source voltage Vgs is falling during the period between t4 and t5 (the part indicated by B in FIG. 2). As pointed out above, the sense ratio Is/Ip rises during the period between t2 and t3 and also during the period between t4 and t5 to produce edges indicated by A and B.

The electric current Is of the conventional art sense MOSFET produces “edges” indicated by A' and B' in FIG. 2 respectively in the period between t2 and t3 and in the period between t4 and t5. The edge A' is attributable to that a rush current flows in addition to that the sense ratio becomes large and shows a value greater than the edge B'. Note that the current waveform of the sense MOSFET in the period between t3 and t4 is an inclined line because voltage Vsw is applied to the reactor L.

Thus, it will be understood that the conventional art current sensing circuit involves a large error in the current sensing signal when the gate-source voltage Vgs is increasing/decreasing.

SUMMARY OF THE INVENTION

In view of the above-identified problem of the related art, it is therefore the object of the present invention is to provide a current sensing circuit that can dissolve the problem of the conventional art and prevent any operation error due to a rush current and/or a shifted sense ratio.

According to the present invention, there is provided a current sensing circuit including: a power MOSFET for supplying power to a load; a series combination of a sense resistor and a sense MOSFET, which connected in parallel to the power MOSFET; a first gate drive circuit for driving the gate of the sense MOSFET, delaying the rising edge of a drive signal by a first delay time; and a second gate drive circuit for driving the gate of the power MOSFET, delaying the falling edge of the drive signal by a second delay time.

In another aspect of the invention, there is provided a current sensing circuit including: a power MOSFET for supplying power to a load; a series combination of a sense resistor and a sense MOSFET, which connected in parallel to the power MOSFET; a first delay circuit for delaying the rising edge and the falling edge of a drive signal by a first delay time; a second delay circuit for delaying the rising edge and the falling edge of the drive signal by a second delay time; an AND circuit for logical AND of the drive signal and a signal arriving by way of the first delay circuit; an OR circuit for logical OR of the drive signal and the signal arriving by way of the second delay circuit; and a current sensing circuit for sensing an electric current of the sense MOSFET based on an electric current of the sense resistor, the gate of the sense MOSFET being driven by the output of the AND circuit, the gate of the power MOSFET being driven by the output of the OR circuit.

In the current sensing circuit according to the present invention, the rising edge of the gate-source voltage of the sense MOSFET may be so defined by means of the first delay time as to exceed a threshold voltage after the clock time when the gate-source voltage of the power MOSFET gets to a high level steady value.

In the current sensing circuit according to the present invention, the clock time when the gate-source voltage of the power MOSFET starts falling from a high-level steady value may be so defined by means of the second delay time as to come behind the clock time when the gate-source voltage of the sense MOSFET falls below a threshold voltage.

Preferably, the power MOSFET of the current sensing circuit according to the present invention may be the power MOSFET of a step-down DC-DC converter or a step-up DC-DC converter.

Thus, the present invention provides a current sensing circuit that can prevent any operation error due to a rush current and/or a shifted sense ratio with an improved accuracy of setting delay times.

DETAILED DESCRIPTION OF THE PREFERRED EMBODIMENTS

Now, the present invention will be described in greater detail by referring to the accompanying drawings that illustrate preferred embodiments of the invention.

First Embodiment

Figure 1:
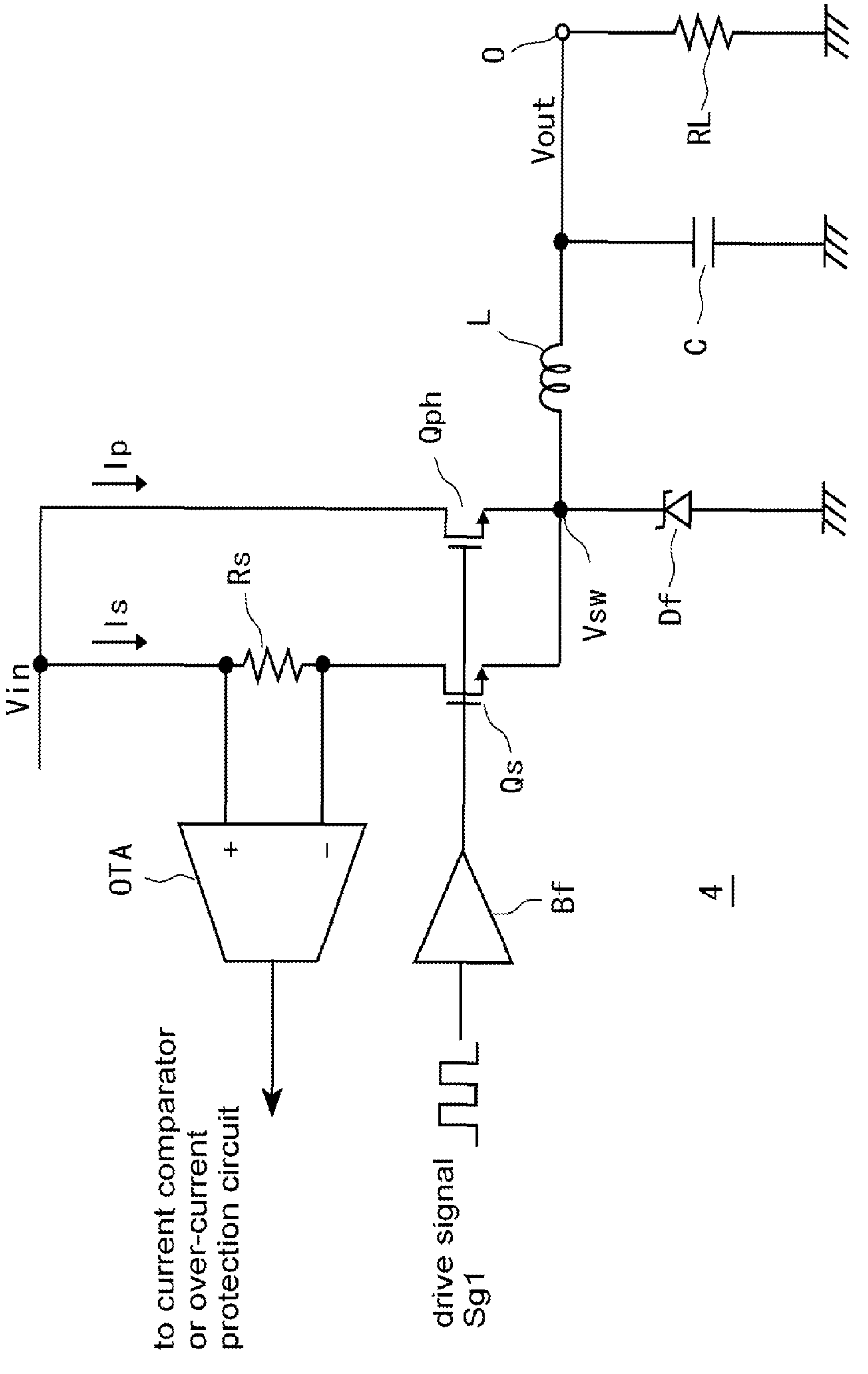
FIG. 1 is a circuit diagram of a current sensing circuit of the conventional art, showing the circuit configuration thereof.
Figure 2:
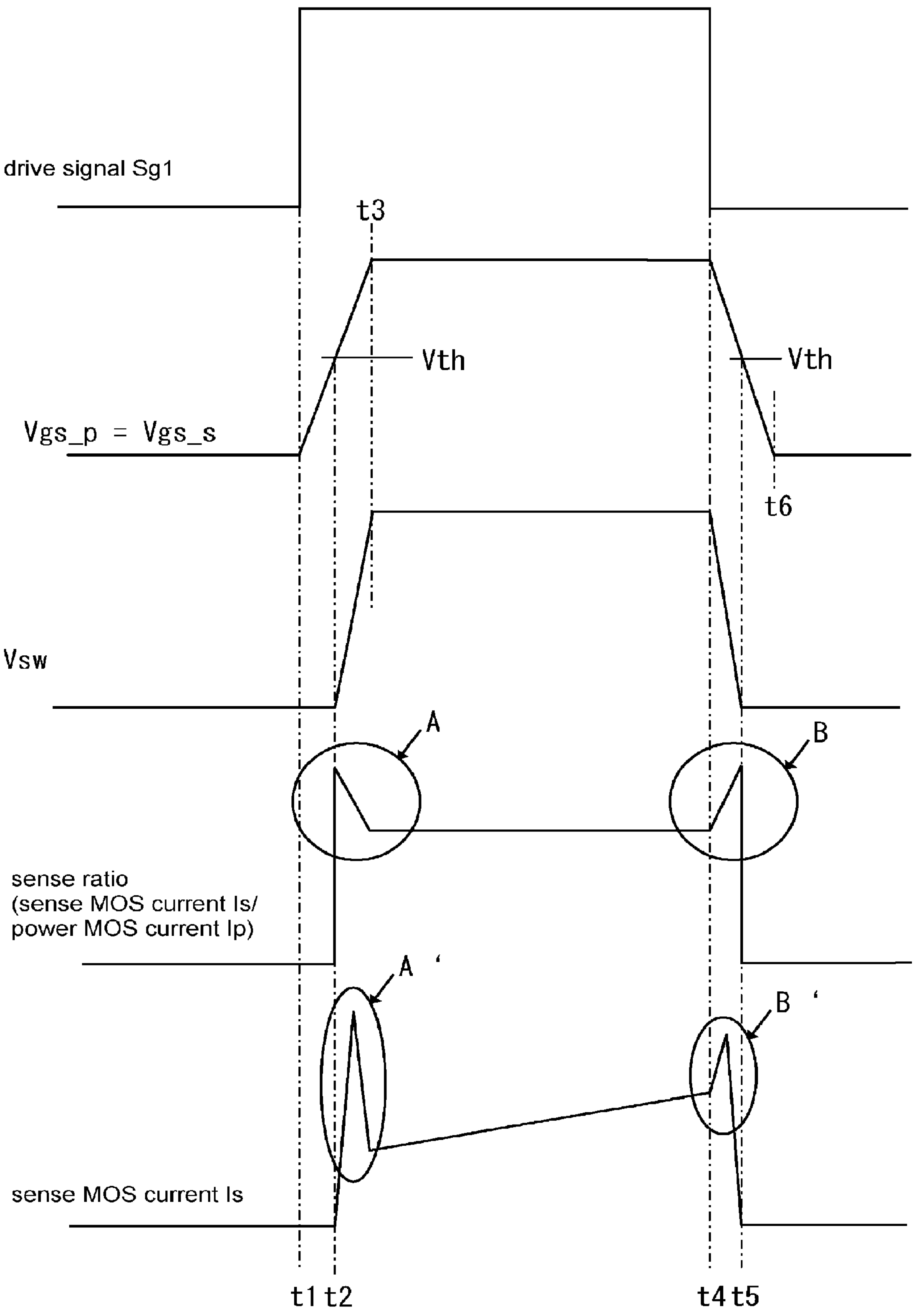
FIG. 2 is a chart showing the signal waveforms and the operation waveforms of different sections of the circuit of FIG. 1.
Figure 3:
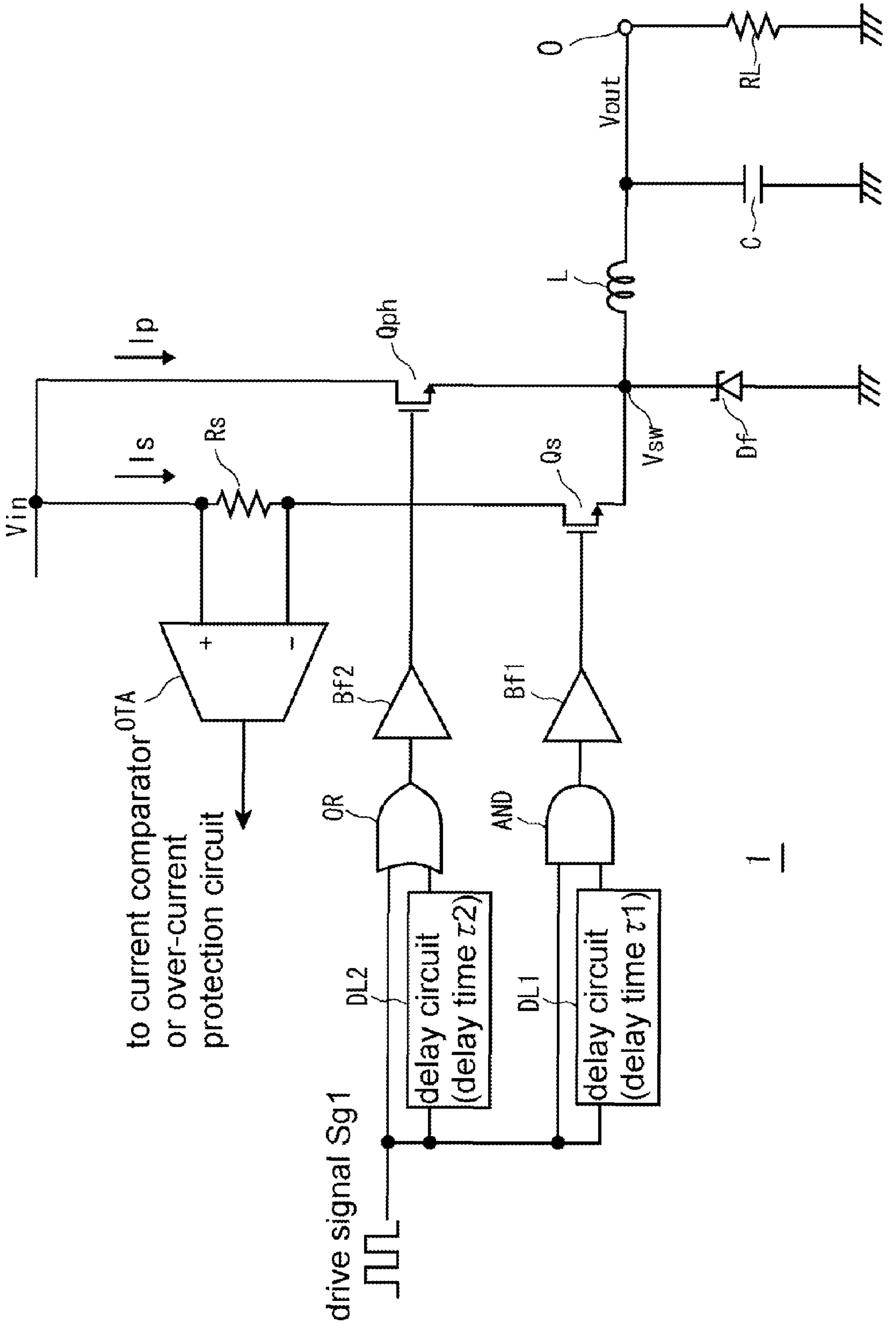
FIG. 3 is a circuit diagram of a current sensing circuit according to an first embodiment of the present invention, showing the circuit configuration thereof.

FIG. 3 is a circuit diagram of the first embodiment of a current sensing circuit according to the present invention for sensing the electric current flowing through a MOSFET.

Figure 4:
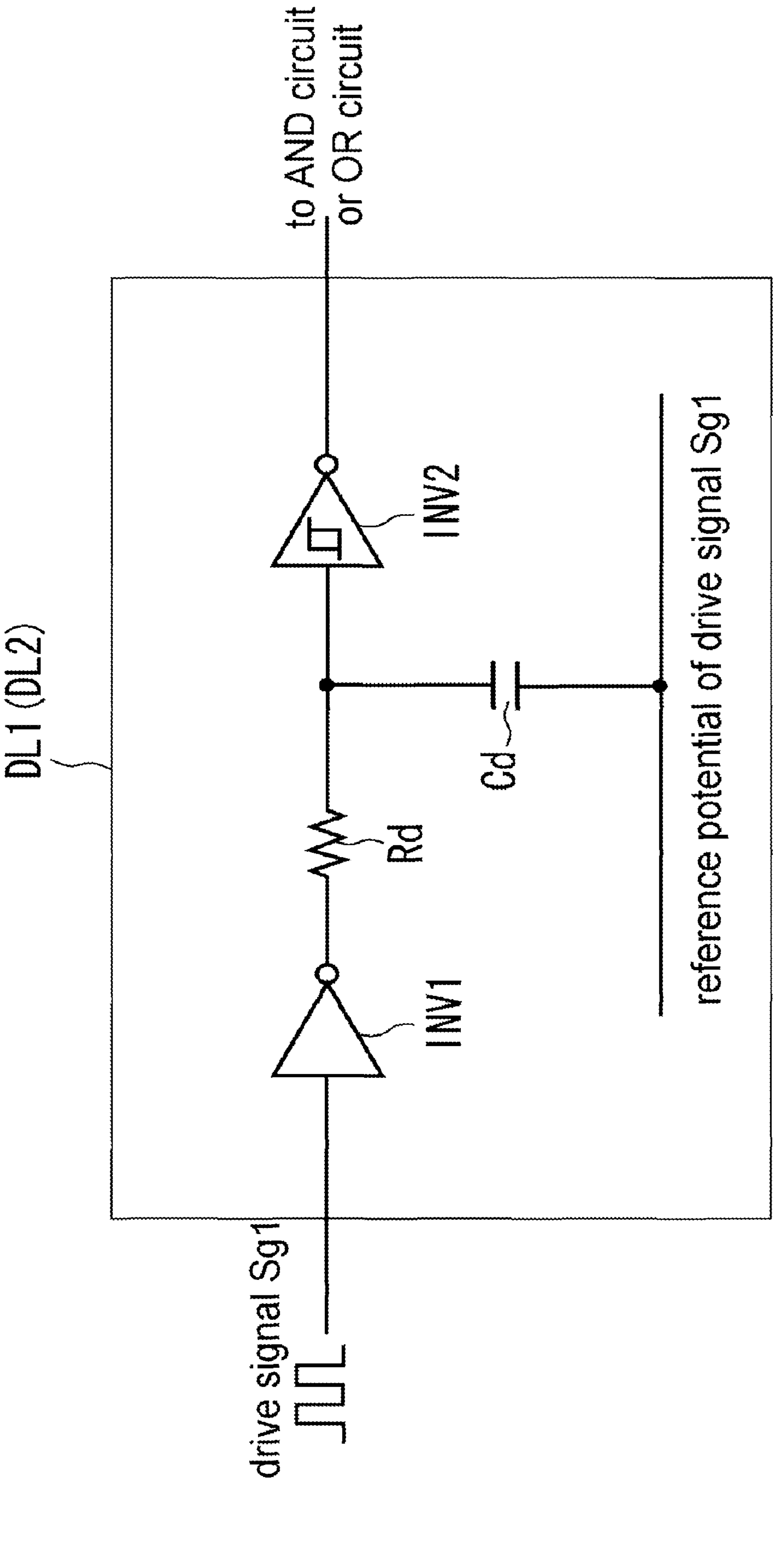
FIG. 4 is a chart showing the detailed configuration of the delay circuit DL1 (or DL2) of FIG. 3.
Figure 5:
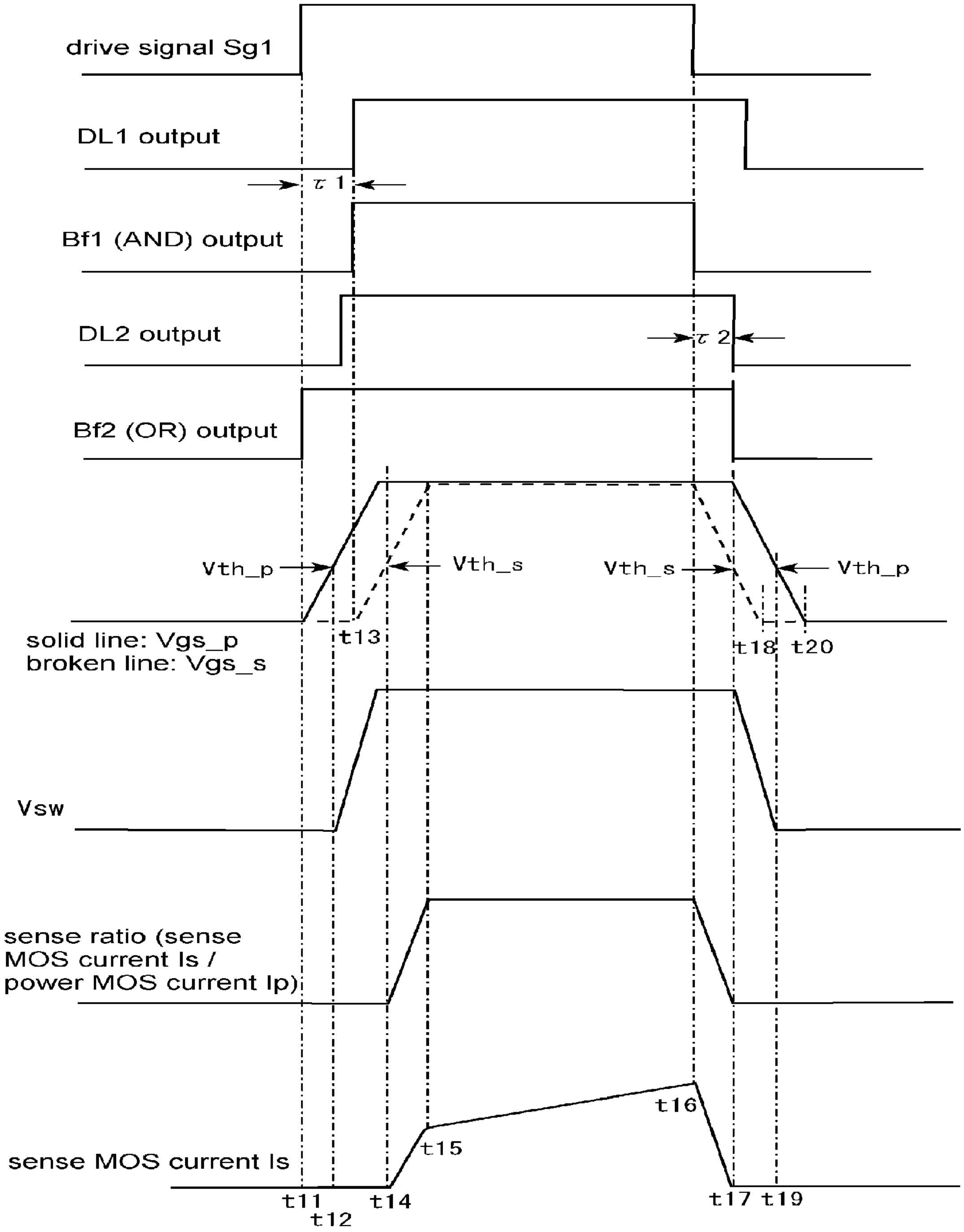
FIG. 5 is a chart showing the signal waveforms and the operation waveforms of different sections of the circuit of FIG. 3.

More specifically, the current sensing circuit according to the present invention as illustrated in FIG. 3 is a current sensing circuit applied to the power MOSFET of a step-down DC-DC converter. The current sensing circuit will be referred to as current sensing circuit 1. FIG. 4 is a circuit diagram of the delay circuits DL1 and DL2 in FIG. 3. FIG. 5 is a chart showing the signal waveforms and the operation waveforms of different sections of the circuit of FIG. 3.

Referring to FIG. 3, reference symbol Qph denotes the power MOSFET that is designed to operate as high-side switching device. Reference symbol Qs denotes the sense MOSFET for sensing an electric current of the power MOSFET. The source terminal of the power MOSFET Qph and that of sense MOSFET Qs are connected to each other and the drain terminal of the power MOSFET Qph is connected to a DC power source Vin. The drain terminal of the sense MOSFET Qs is connected to the DC power source Vin by way of a sense resistor Rs. The connection point where the source terminal of the power MOSFET Qph and that of the sense MOSFET Qs are connected is by turn connected to an output terminal O by way of a reactor L. A free wheel diode Df is connected between the connection point where the source terminal of the power MOSFET Qph and that of the sense MOSFET Qs are connected and a grounding terminal and a smoothing capacitor C and a load RL are connected between the output terminal O and the grounding terminal. The reactor L and the smoothing capacitor C form a DC smoothing circuit at the output section of the step-down DC-DC converter. The sense resistor Rs is connected at the opposite ends thereof to the inverting terminal (−) and the non-inverting terminal (+) of a current sensing circuit OTA. The current sensing circuit OTA detects any voltage fall of the sense resistor Rs and outputs it as a current signal. Note that the current sensing circuit OTA may be replaced by an ordinary operational amplifier for amplifying a voltage.

A drive signal Sg1 that varies each time is input to the gate terminal of the sense MOSFET Qs and that of the power MOSFET Qph. More specifically, the drive signal input terminal is connected to one of the input terminals of an AND circuit and also to one of the input terminals of an OR circuit while it is connected to the other input terminal of the AND circuit by way of delay circuit DL1 and also to the other input terminal of the OR circuit by way of a delay circuit DL2. The output terminal of the AND circuit is connected to the gate terminal of the sense MOSFET Qs by way of a buffer circuit Bf1, while the output terminal of the OR circuit is connected to the gate terminal of the power MOSFET Qph by way of a buffer circuit Bf2.

The delay circuit DL1 and the delay circuit DL2 have respective delay times $\tau 1$ and $\tau 2$ that are different from each other and the AND circuit outputs a signal representing the logical AND of the drive signal Sg1 input to one of the input terminals thereof and the signal obtained by delaying the drive signal Sg1 by delay time $\tau 1$ while the OR circuit outputs a signal representing the logical OR of the drive signal Sg1 input to one of the input terminals thereof and the signal obtained by delaying the drive signal Sg1 by delay time $\tau 2$. As will be described in greater detail hereinafter, the delay times $\tau 1$ and $\tau 2$ can be determined respectively as a function of the turn on rise time characteristics and the turn off fall time characteristics of the sense MOSFET Qs and as a function of those of the power MOSFET Qph.

FIG. 4 is a circuit diagram of the delay circuits DL1 and DL2 in FIG. 3. Referring to FIG. 4, an inverter circuit INV1 (NOT circuit) is a logical circuit for inverting the low level and the high level of a signal. Inverter circuit INV2 is an inverter circuit (NOT circuit) having hysteresis characteristics. Resistor Rd and condenser Cd form a delay circuit. The delay time of the delay circuit can be determined by the product of the resistance of the resistor Rd and the capacitance of the capacitor Cd (CR time constant) and the width of the hysteresis characteristics of INV2.

With the current sensing circuit 1 having the above-described configuration, the drive signal Sg1 is input to the gate terminal of the sense MOSFET Qs by way of the delay circuit DL1, the AND circuit and the buffer circuit Bf1, while it is input to the gate terminal of the power MOSFET Qph by way of the delay circuit DL2, the logical OR circuit and the buffer circuit Bf2 so that the sense MOSFET Qs and the power MOSFET Qph are controlled for on and off. The electric current flowing through the sense resistor Rs is sensed by the current sensing circuit OTA as an electric current that is proportional to the electric current flowing through the power MOSFET Qph.

FIG. 5 is a chart showing the signal waveforms and the operation waveforms of different sections of the circuit of FIG. 3. The waveforms in FIG. 3 are from above that of drive signal Sg1, that of the output signal of the delay circuit DL1, that of the output signal of the logical AND circuit (the output signal of the buffer circuit Bf1), that of the output signal of the delay circuit DL2, that of the output signal of the OR circuit (the output signal of the buffer circuit Bf2), those of the gate-source voltages of the sense MOSFET Qs and the power MOSFET Qph (solid line: the gate-source voltage waveform Vgs_p of the power MOSFET Qph, dotted line: the gate-source voltage waveform Vgs_s of the sense MOSFET Qs, that of the voltage Vsw at the connection point of the source terminal of the power MOSFET Qph and that of the sense MOSFET Qs, that of the sense ratio (the sense MOSFET electric current Is/the power MOSFET electric current Ip) and that of the electric current Is of the sense MOSFET.

Drive signal Sg1 is input as on signal when it is at high level and as off signal when it is at low level. The output signal of the delay circuit DL1 is such that both the rising edge and the falling edge of the signal are delayed by delay time τ1 relative to the drive signal Sg1. The output signal of the AND circuit (the output signal of the buffer circuit Bf1) is the logical AND of the drive signal Sg1 and the output signal of the delay circuit DL1. In other words, the rising edge of the signal is same as the rising edge of the output signal of the delay circuit DL1 and the falling edge of the signal is same as the falling edge of the drive signal Sg1. The output signal of the delay circuit DL2 is such that both the rising edge and the falling edge of the signal are delayed by delay time τ2 relative to the drive signal Sg1. The output signal of the OR circuit (the output signal of the buffer circuit Bf2) is the logical OR of the drive signal Sg1 and the output signal of the delay circuit DL2. In other words, the rising edge of the signal is same as the rising edge of the drive signal Sg1 and the falling edge of the signal is same as the falling edge of the output signal of the delay circuit DL2.

As the output signal of the buffer circuit Bf2 is input to the gate terminal of the power MOSFET Qph, the gate-source voltage waveform Vgs_p (solid line) of the power MOSFET Qph rises between clock time t11 and clock time t14 and falls between clock time t17 and clock time t20. On the other hand, the gate-source voltage waveform Vgs_s (dotted line) of the sense MOSFET Qs rises between clock time t13 and clock time t15 and falls between clock time t16 and clock time t18. Note that the rising clock time t13 of the gate-source voltage waveform Vgs_s (dotted line) is delayed by delay time τ1 from the rising clock time t11 of the gate-source voltage waveform Vgs_p (solid line), whereas the falling clock time t16 of the gate-source voltage waveform Vgs_s (dotted line) is advanced by delay time τ2 from the falling clock time t17 of the gate-source voltage waveform Vgs_p (solid line).

The voltage Vsw of the connection point where the source terminal of the power MOSFET Qph and that of the sense MOSFET Qs are connected rises between clock time t12 when the gate-source voltage of the power MOSFET Qph exceeds threshold voltage Vth_p and clock time t14 and falls between clock time t17 when the gate signal of the power MOSFET Qph starts to become off and clock time t19 when it reaches the threshold voltage Vth_p.

The electric current Is of the sense MOSFET Qs rises between clock time t14 when the gate-source voltage of the sense MOSFET Qs exceeds threshold voltage Vth_s and falls between clock time t16 when the gate signal of the sense MOSFET Qs starts to become off and clock time t17 when it reaches the threshold voltage Vth_p.

The sense ratio is the ratio of the electric current Is of the sense MOSFET Qs/the electric current Ip of the power MOSFET Qph. Thus, it shows a certain value in the period during which the electric current Is of the sense MOSFET Qs, or the numerator, shows a certain value, in other words, in the period between t14 and t17 during which an electric current flows through the sense MOSFET Qs. As for the electric current Ip of the power MOSFET Qph, or the denominator, since the voltage Vsw of the connection point where the source terminal of the power MOSFET Qph and that of the sense MOSFET Qs are connected has already got to a steady value at clock time t14, the on-resistance Rqp of the power MOSFET Qph also has got to a steady value. Besides, the sense MOSFET Qs falls between clock time t16 and clock time t17 when the power MOSFET Qph starts to become off and the gate-source voltage Vgs_s of the sense MOSFET Qs is sufficiently low (desirably already off) at clock time t17. Thus, the power MOSFET Qph maintains the on-resistance Rqp in steady state during the period between t14 and t17 during which an electric current is flowing through the sense MOSFET Qs. Since the on-resistance Rqs of the sense MOSFET Qs also shows a steady value during the period between t15 and t16 during which the sense MOSFET Qs is in steady state, the sense ratio is held to a constant value as shown in FIG. 5. As the sense MOSFET Qs becomes off with a delay relative to the power MOSFET Qph, a large electric current forcibly flows to the sense MOSFET Qs due to the electric current produced by the induced electromotive force of the reactor L so that ASO (area of safe operation) destruction can take place. However, with the current sensing circuit of this embodiment, the problem of ASO destruction does nor arise because the sense MOSFET Qs goes off in advance relative to the power MOSFET Qph.

The period between t14 and t15 during which the electric current of the sense MOSFET Qs rises and the period between t16 and t17 during which the electric current of the sense MOSFET Qs falls come when the on-resistance Rqp of the power MOSFET Qph has fallen to a steady value that is sufficiently low and the on-resistance Rqs of the sense MOSFET Qs is falling in response to a rise of the gate-source voltage Vgs_s. Therefore, the sense ratio changes from 0 to a steady value without overshooting. In other words, it changes steadily without producing "edges" unlike the conventional art.

A current sensing circuit of the conventional art is accompanied by a problem that it senses a rush current in a period during which the electric current of the sense MOSFET Qs rises. However, the current sensing circuit 1 of this embodiment senses an electric current only after a rush current flows in the period between t12 and t14 and the power MOSFET Qph gets to steady state and settles down in that state so that the problem of sensing a rush current is dissolved.

As for the period during which the gate-source voltage of the sense MOSFET Qs is rising, the clock time t14 when it goes above threshold voltage Vth_s is preferably equal to or slightly behind the clock time when the gate-source voltage Vgs_p of the power MOSFET Qph gets to high-level steady state. As for the period during which the gate-source voltage of the sense MOSFET Qs is falling, the clock time t17 when it falls below threshold voltage Vth_s is preferably equal to or slightly ahead of the clock time when the gate-source voltage Vgs_p of the power MOSFET Qph starts falling from high-level steady state.

Second Embodiment

Figure 6:
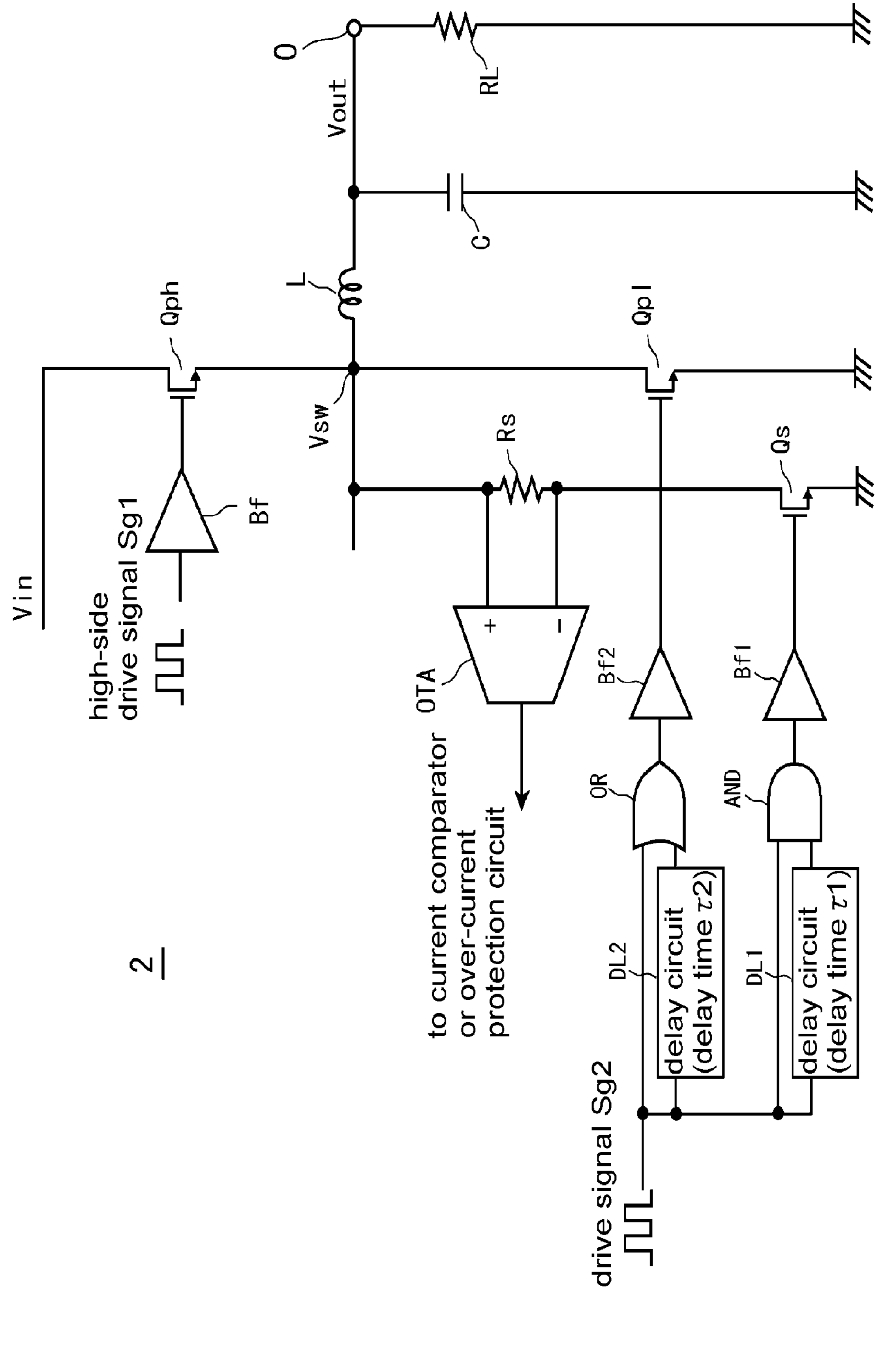
FIG. 6 is a circuit diagram of a current sensing circuit according to a second embodiment of the present invention, showing the circuit configuration thereof.

FIG. 6 is a circuit diagram of the current sensing circuit 2 that is the second embodiment of the present invention. While the current sensing circuit 1 of the first embodiment is applied to the power MOSFET operating as high-side switching device Qph, the current sensing circuit 2 of the second embodiment is applied to a power MOSFET Qp1 operating as low side switching device, although the present invention is applied to sensing an electric current of the power MOSFET of a step-down DC-DC converter in either case. The current sensing circuit 2 of the second embodiment is same as the current sensing circuit 1 of the first embodiment in terms of electric connections and also in terms of operation and hence will not be described here any further. The current sensing circuit 2 of the second embodiment provides advantages similar to those of the current sensing circuit 1 of the first embodiment.

Third Embodiment

Figure 7:
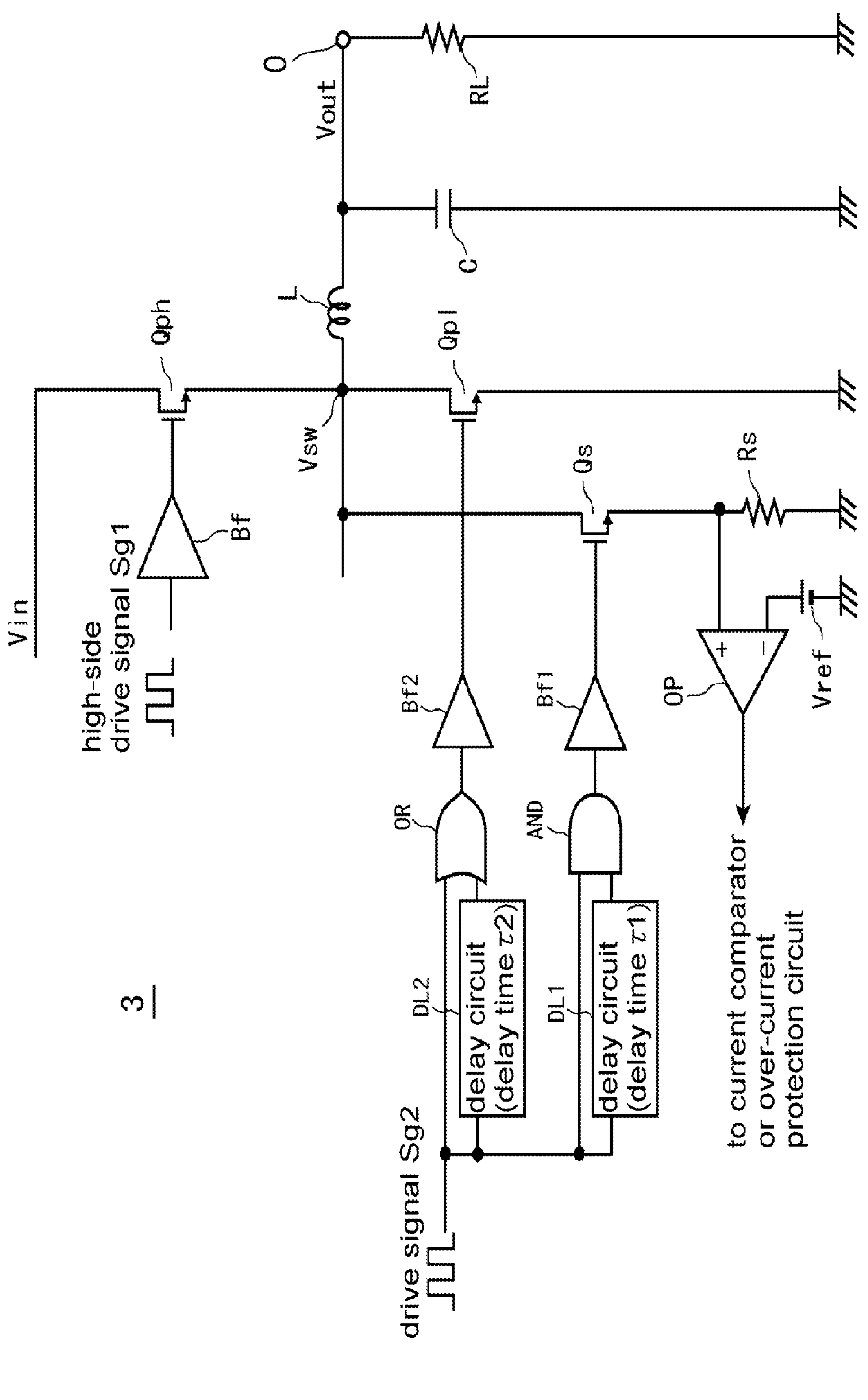
FIG. 7 is a circuit diagram of a current sensing circuit according to a third embodiment of the present invention, showing the circuit configuration thereof.

FIG. 7 is a circuit diagram of the current sensing circuit 3 that is the third embodiment of the present invention. In the current sensing circuit 3 of the third embodiment, the sense resistor Rs and the sense MOSFET Qs are inverted relative to those of the current sensing circuit 2 of the second embodiment in terms of connection and the current sensing circuit OTA is replaced by operational amplifier OP in the third embodiment. The non-inverting input terminal of the operational amplifier OP is connected to one of the opposite ends (the end opposite to the grounded end) of the sense resistor and reference voltage Vref is connected to the inverting input terminal of the operational amplifier OP. The operational amplifier OP operates in effect as comparator and the reference voltage Vref is the reference voltage for sensing an over-current. The operation of the current sensing circuit 3 of the third embodiment is similar to that of the current sensing circuit 2 of the second embodiment and hence will not be described here any further. The current sensing circuit 3 of the third embodiment provides advantages similar to those of the current sensing circuit 1 of the first embodiment.

While the present invention is described above by way of specific embodiments, it may be needless to say that they are simply exemplary embodiments and can be modified and altered in various different ways without departing from the spirit and scope of the present invention. While the present invention is applied to current sensing circuits for the power MOSFETs of step-down DC-DC converters in the above description, the present invention can also be applied to current sensing circuits for the power MOSFETs of step-up DC-DC converters, although the present invention is by no means limited thereto and can also be applied to the inverter circuits of DC/AC converters.

What is claimed is:

1. A current sensing circuit comprising:

a power MOSFET for supplying power to a load;

a series combination of a sense resistor and a sense MOSFET, which connected in parallel to the power MOSFET;

a first gate drive circuit for driving the gate of the sense MOSFET, delaying the rising edge of a drive signal by a first delay time; and a second gate drive circuit for driving the gate of the power MOSFET, delaying the falling edge of the drive signal by a second delay time, wherein the rising edge of the gate-source voltage of the sense MOSFET is so defined by means of the first delay time as to exceed a threshold voltage after the clock time when the gate-source voltage of the power MOSFET gets to a high level steady value.

2. A current sensing circuit comprising:

a power MOSFET for supplying power to a load;

a series combination of a sense resistor and a sense MOSFET, which connected in parallel to the power MOSFET;

a first gate drive circuit for driving the gate of the sense MOSFET, delaying the rising edge of a drive signal by a first delay time; and a second gate drive circuit for driving the gate of the power MOSFET, delaying the falling edge of the drive signal by a second delay time, wherein the clock time when the gate-source voltage of the power MOSFET starts falling from a high-level steady value is so defined by means of the second delay time as to come behind the clock time when the gate-source voltage of the sense MOSFET falls below a threshold voltage.

3. A current sensing circuit comprising:

a power MOSFET for supplying power to a load;

a series combination of a sense resistor and a sense MOSFET, which connected in parallel to the power MOSFET;

a first gate drive circuit for driving the gate of the sense MOSFET, delaying the rising edge of a drive signal by a first delay time; and a second gate drive circuit for driving the gate of the power MOSFET, delaying the falling edge of the drive signal by a second delay time, wherein the power MOSFET is the power MOSFET of a step-down DC-DC converter or a step-up DC-DC converter.

4. A current sensing circuit comprising:

a power MOSFET for supplying power to a load;

a series combination of a sense resistor and a sense MOSFET, which connected in parallel to the power MOSFET;

a first delay circuit for delaying the rising edge and the falling edge of a drive signal by a first delay time;

a second delay circuit for delaying the rising edge and the falling edge of the drive signal by a second delay time;

an AND circuit for logical AND of the drive signal and a signal arriving by way of the first delay circuit;

an OR circuit for logical OR of the drive signal and the signal arriving by way of the second delay circuit; and a current sensing circuit for sensing an electric current of the sense MOSFET based on an electric current of the sense resistor, a gate of the sense MOSFET being driven by the output of the AND circuit, a gate of the power MOSFET being driven by the output of the OR circuit.

5. The current sensing circuit according to claim 4, wherein the rising edge of the gate-source voltage of the sense MOSFET is so defined by means of the first delay time as to exceed a threshold voltage after the clock time when the gate-source voltage of the power MOSFET gets to a high level steady value.

6. The current sensing circuit according to claim 4 , wherein the clock time when the gate-source voltage of the power MOSFET starts falling from a high-level steady value is so defined by means of the second delay time as to come behind the clock time when the gate-source voltage of the sense MOSFET falls below a threshold voltage.

7. The current sensing circuit according to claim 4, wherein the power MOSFET is the power MOSFET of a step-down DC-DC converter or a step-up DC-DC converter.

* * * * *